(12) United States Patent
Lui et al.

(10) Patent No.: US 6,771,266 B2
(45) Date of Patent: Aug. 3, 2004

(54) METHOD AND APPARATUS FOR IMPROVING THE APPEARANCE OF DIGITALLY REPRESENTED HANDWRITING

(75) Inventors: Charlton E. Lui, Redmond, WA (US); Leroy B. Keely, Portola Valley, CA (US); Bodin Dresevic, Bellevue, WA (US); Shenbagalakshmi Pichaiah, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 376 days.

(21) Appl. No.: 09/760,631

(22) Filed: Jan. 16, 2001

(65) Prior Publication Data

US 2002/0093501 A1 Jul. 18, 2002

(51) Int. Cl.[7] .............................................. G06T 11/20
(52) U.S. Cl. ..................................................... 345/442
(58) Field of Search ............................... 345/442, 440, 345/441, 443, 467; 382/187; 704/231

(56) References Cited

U.S. PATENT DOCUMENTS

| | | | |
|---|---|---|---|
| 5,261,033 A | * 11/1993 | Oka | 345/442 |
| 5,473,742 A | * 12/1995 | Polyakov et al. | 345/442 |
| 5,694,535 A | * 12/1997 | Broekhuijsen | 345/442 |
| 5,731,820 A | * 3/1998 | Broekhuijsen | 345/442 |
| 5,848,270 A | * 12/1998 | DeLuca et al. | 709/105 |
| 5,926,567 A | * 7/1999 | Collins et al. | 382/187 |
| 6,278,445 B1 | * 8/2001 | Tanaka et al. | 345/178 |
| 6,415,256 B1 | * 7/2002 | Ditzik | 704/231 |
| 6,577,307 B1 | * 6/2003 | Hsiao et al. | 345/422 |

* cited by examiner

*Primary Examiner*—Don Wong
*Assistant Examiner*—Huedung X. Cao
(74) *Attorney, Agent, or Firm*—Banner & Witcoff, Ltd.

(57) ABSTRACT

Digitized handwriting is captured and provided in real-time to a display in the form of polylines. The polylines are then converted to a parametric representation, thereby filtering out noise and distortion effects attributable to the digitization process. To further refine quality, the smoothed, digitized handwriting is further subjected to edge-smoothing processing to mitigate the effects of relatively low-resolution displays. In this manner, the present invention improves the appearance of digitized handwriting in comparison to prior art techniques.

2 Claims, 6 Drawing Sheets

-PRIOR ART-

FIG. 4

-PRIOR ART-

-PRIOR ART-

FIG. 7

METHOD AND APPARATUS FOR IMPROVING THE APPEARANCE OF DIGITALLY REPRESENTED HANDWRITING

CROSS-REFERENCE TO RELATED APPLICATIONS

This application claims the benefit of the Nov. 10, 2000 filing date of co-pending provisional application Ser. No. 60/247,182, entitled Method And Apparatus For Improving The Appearance Of Digitally Represented Handwriting, which is incorporated herein by reference.

The present application is related to application Ser. No., entitled Highlevel Active Pen Matrix, application Ser. No., entitled Mode Hinting/Switching, application Ser. No., entitled Selection Handles, application Ser. No., entitled Bungee Space Tool, application Ser. No., entitled Classifying, Anchoring, Transforming or Implementing Ink, application Ser. No., entitled Hold for Right Click in Windows Environment, application Ser. No., entitled Press and Hold Feedback to Select, application Ser. No., entitled Spectrum of Input Methods, application Ser. No., entitled In Air Gestures, application Ser. No., entitled MIP Windows Class List, application Ser. No., entitled Mouse Input Panel and User Interface, and application Ser. No., entitled Smart Page Breaks, each filed concurrently with the present application and each of which is incorporated by reference herein.

TECHNICAL FIELD

The present invention relates generally to input of data to a computer system and, in particular, to a method and apparatus for improving the appearance of digitally represented handwriting input to such computer systems.

BACKGROUND OF THE INVENTION

Portable computing platforms are a continually evolving component of computing technology. Increasingly, users of such systems are demanding levels of functionality in portable computing platforms equivalent to that found in more conventional desktop platforms. Technology currently exists to provide, in a portable platform, the functionality to which users have become accustomed in their more conventional platforms. One type of portable platform in this category is the so-called tablet computer.

Generally, tablet computers comprise a display screen and a digitizer co-extant with or integrated into the display screen. In combination with a stylus or other pen-like device, the digitizer is capable of capturing, as digital samples, movements of the stylus relative to the digitizer. The captured movements may then be displayed on the display screen, typically in real time. Using the stylus and digitizer combination, a user is able to "write" on the computer's display screen and have his or her handwriting captured and displayed on the display screen. The term "inking" is sometimes used to distinguish this mode of data entry from other modes, e.g., typing on a keyboard or recognition of handwritten input. The capture and display of handwriting is considered a subclass of inking, which may otherwise include capturing freehand drawings and the like. Once captured, it is also known to perform character recognition analysis on the digital handwriting, thereby providing a convenient method of data entry.

Figure 4:
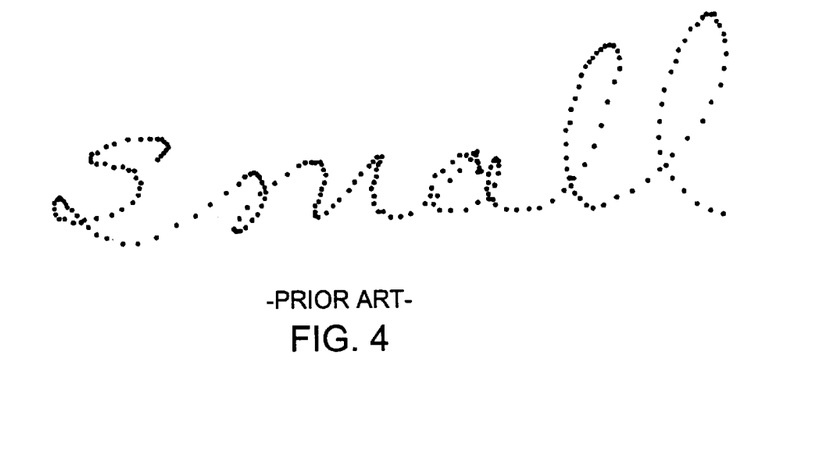
FIG. 4 illustrates a prior art technique for digitizing handwriting.

The manner in which handwriting is digitized is illustrated in FIG. 4. As shown, various samples of the curves forming the handwriting are taken at periodic intervals. Typically, the samples comprise rectangular coordinates. Assuming a constant sampling period, the spacing between samples is indicative of the speed of the pen or stylus used to create the samples. The samples illustrated in FIG. 4 may be used to create a so-called polyline representation of the captured handwriting. In general, a polyline curve comprises a plurality of points with straight lines connecting successive points and, as such, represents an approximation of the actual curve. Higher sampling rates will generally provide a more accurate approximation. Stated another way, polyline curves introduce a level of noise or distortion to the curves they represent, which noise or distortion is a function, in part, of the sampling rate used and the speed at which the pen is moved. For example, using a typical sampling rate of 80 samples per second, handwriting displayed as polyline curves can be noticeably distorted. This problem is further exacerbated by the variability in human handwriting; some users have neat handwriting and others do not. Further still, sampling noise inherent in digitizers leads to additional inaccuracies in the resulting samples.

Figure 5:
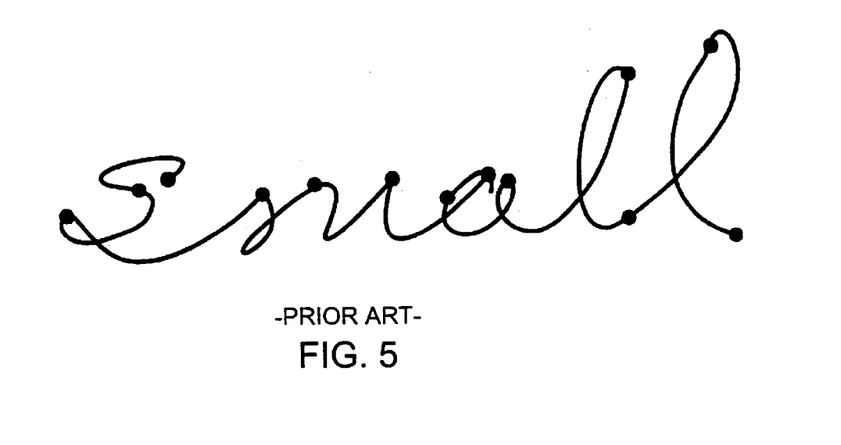
FIG. 5 illustrates the results of smoothing operations, in accordance with the prior art, performed on the digitized handwriting of FIG. 4.

One technique used to improve the appearance of digitized handwriting is disclosed in U.S. Pat. No. 5,473,742 issued to Polyakov et al. and entitled Method And Apparatus For Representing Image Data Using Polynomial Approximation Method And Iterative Transformation-Reparameterization Technique (hereinafter "Polyakov"), the teachings of which patent are hereby incorporated by this reference. In general, Polyakov teaches a technique wherein polyline curves, particularly those representative of digitized handwriting, are converted to a parametric representation that reduces the distortions resulting from the factors described above. The results of the Polyakov technique, as applied to the digitized handwriting of FIG. 4, are illustrated in FIG. 5. As shown, the polyline representation of FIG. 4 is converted to a series of connected, parametric curves (twelve shown, separated by dots). As can be seen in FIG. 5, the resulting curves effect a smoothing of the original digitized handwriting, thereby improving overall appearance of the handwriting.

Figure 6:
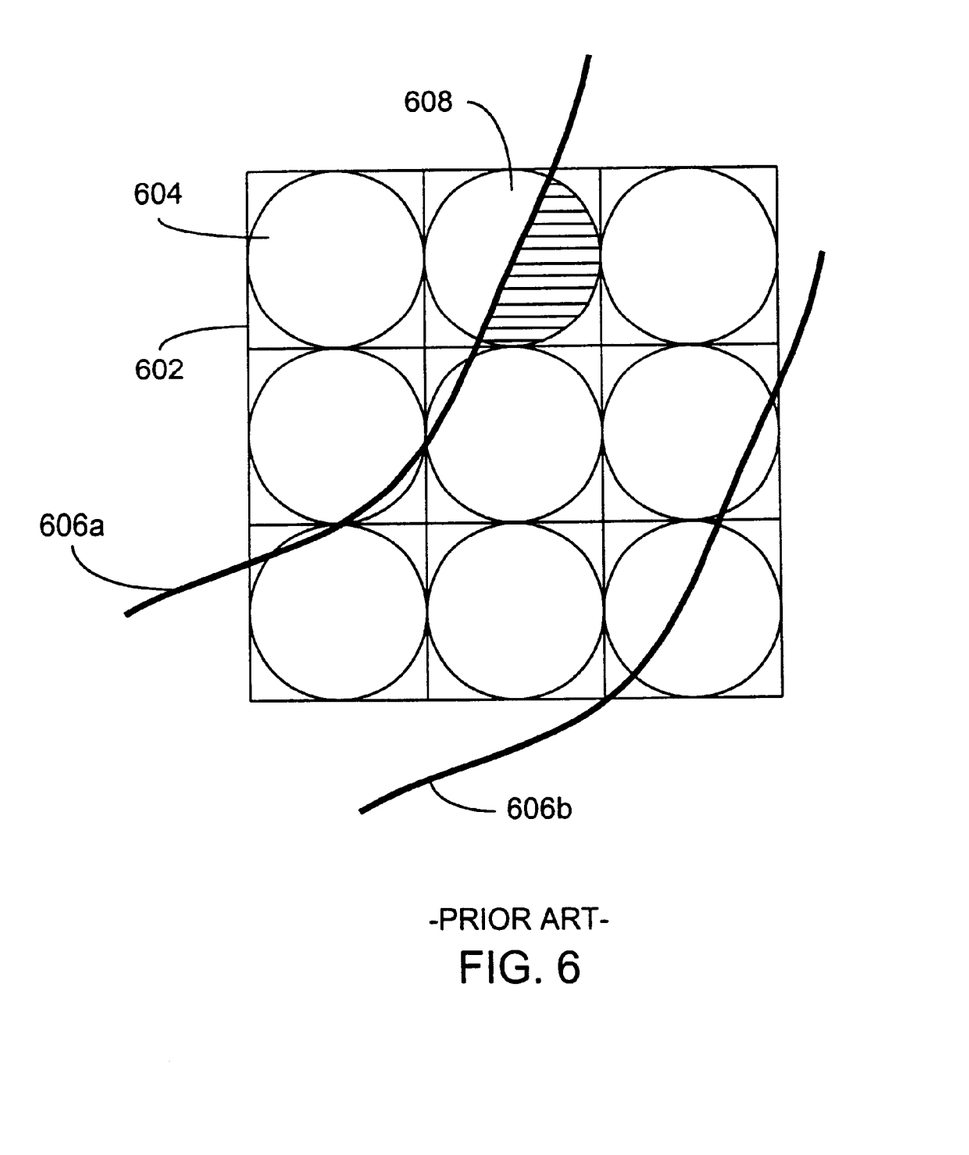
FIG. 6 illustrates a prior art technique for anti-aliasing processing particularly directed to use with cathode ray tube (CRT) type displays.

While the technique taught by Polyakov is helpful, it does little to address aliasing problems that can result when the smoothed handwriting is subsequently displayed on a display device. As known in the art, display devices can have varying resolution as determined by the number and geometry of the display elements (e.g., pixels) used to form the overall display area. In general, display devices have a lower resolution than digitizers of the type described above. The lower resolution provided by displays can lead to the aliasing effect. An example of this effect is illustrated in FIG. 6. FIG. 6 illustrates a highly magnified view of a grid of display elements 602 forming but a portion of a larger display area. A curve to be displayed is represented by the area between the two heavy lines having reference numerals 606a and 606b. Assuming that the foreground color (i.e., the color of the curve defined by the space between the heavy lines 606a–b) is different from the background color (i.e., the color of all areas outside the space defined by the heavy lines 606a–b), a dilemma is presented with regard to picture elements 608 that are not totally covered by the curve. That is, because the picture element 608 is the most basic display increment available and cannot be subdivided further, a decision must be made to activate the partially covered pixel 608 in accordance with the foreground color or the background color. If the foreground color is used, the curve will appear overly-thick and jagged. In contrast, if the background color is used, the curve will appear overly-thin and similarly jagged. The overall effect of aliasing is to decrease the perceived quality of appearance of the displayed curve. Because aliasing is a function of the display resolution, Polyakov and other similar techniques will not eliminate the effect of aliasing.

It would therefore be advantageous to provide a technique whereby the appearance of digital handwriting may be improved. Such techniques should preferably build upon existing techniques while simultaneously overcoming their limitations.

SUMMARY OF THE INVENTION

The present invention provides a technique whereby the appearance of digital handwriting may be improved. Digitized handwriting is captured and provided in real-time to a display in the form of polylines. The polylines are then converted to a parametric representation to effectively filter out the noise and distortion effects attributable to the process of obtaining digitized handwriting. To further refine quality, the filtered, digitized handwriting is subjected to edge-smoothing processing to mitigate the effects of relatively low-resolution displays. In this manner, the present invention improves the appearance of digitized handwriting in comparison to prior art techniques.

BRIEF DESCRIPTION OF THE DRAWINGS

In the detailed description of presently preferred embodiments of the present invention which follows, reference will be made to the drawings comprised of the following figures, wherein like reference numerals refer to like elements in the various views and wherein.

DETAILED DESCRIPTION OF THE INVENTION

Figure 1:
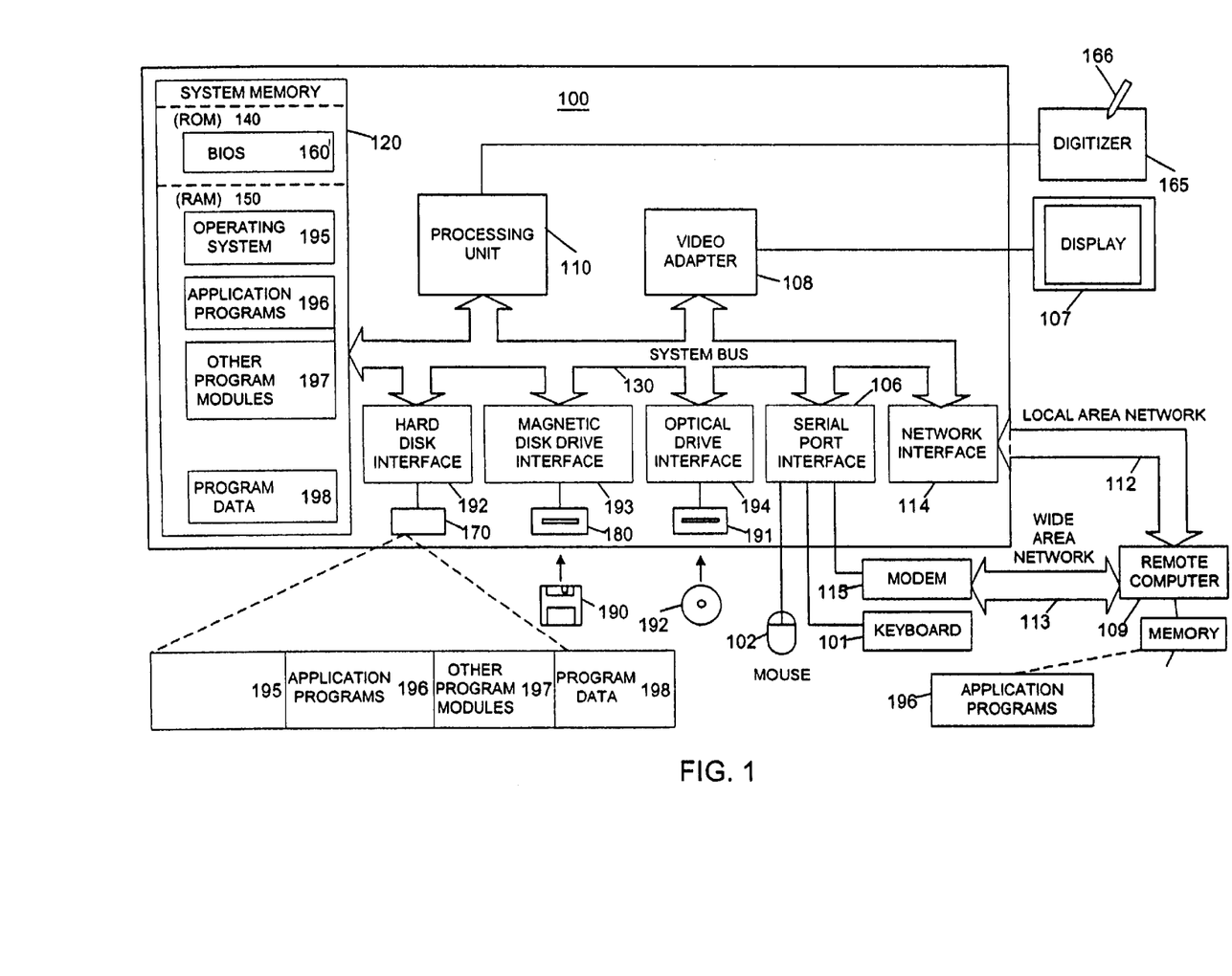
FIG. 1 is a schematic block diagram of a conventional general-purpose digital computing environment that can be used to implement various aspects of the present invention.

The present invention may be more readily described with reference to FIGS. 1–7. FIG. 1 illustrates a schematic diagram of a conventional general-purpose digital computing environment that can be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers. In a preferred embodiment, a pen digitizer 165 and accompanying pen or stylus 166 are provided in order to digitally capture freehand input. Although a direct connection between the pen digitizer 165 and the processing unit 110 is shown, in practice, the pen digitizer 165 may be coupled to the processing unit 110 via a serial port, parallel port or other interface and the system bus 130 as known in the art. Furthermore, although the digitizer 165 is shown apart from the monitor 107, it is preferred that the usable input area of the digitizer 165 be co-extensive with the display area of the monitor 107. Further still, the digitizer 165 may be integrated in the monitor 107, or may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are exemplary and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Figure 2:
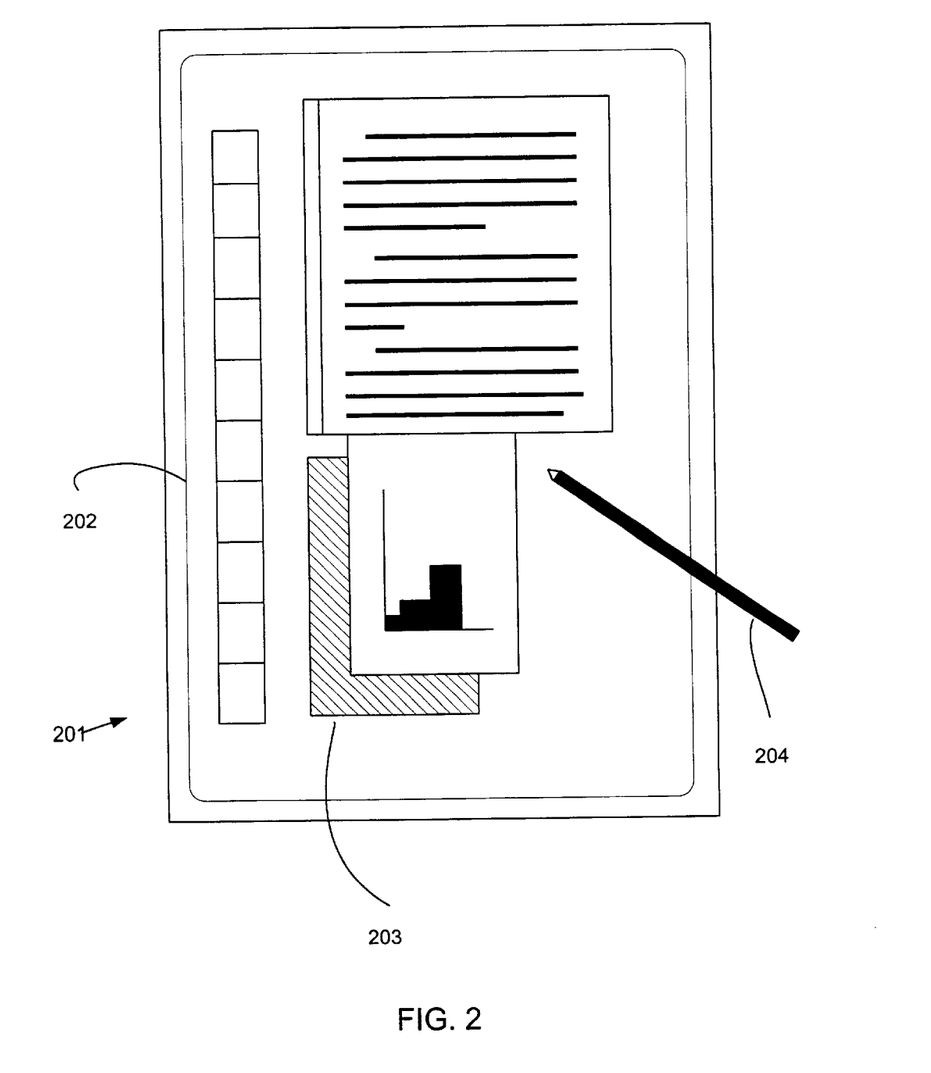
FIG. 2 illustrates a tablet and stylus computer that can be used in accordance with various aspects of the present invention.

FIG. 2 illustrates a tablet and stylus computer that can be used in accordance with various aspects of the present invention. Any or all of the features, subsystems, and functions in the system of FIG. 1 can be included in the computer of FIG. 2. Tablet PC 201 includes a large display surface 202, e.g., a digitizing flat panel display, preferably, a liquid crystal display (LCD) screen, on which a plurality of windows 203 is displayed. Using stylus 204, a user can select, highlight, and write on the digitizing display area. Examples of suitable digitizing display panels include electromagnetic pen digitizers, such as the Mutoh or Wacom pen digitizers. Other types of pen digitizers, e.g., optical digitizers, may also be used. The computer 201 interprets marks made using stylus 204 in order to manipulate data, enter text, and execute conventional computer application tasks such as spreadsheets, word processing programs, and the like.

A stylus could be equipped with buttons or other features to augment its selection capabilities. In one embodiment, a stylus could be implemented as a "pencil" or "pen", in which one end constitutes a writing portion and the other end constitutes an "eraser" end, and which, when moved across the display, indicates portions of the display are to be erased. Other types of input devices, such as a mouse, trackball, or the like could be used. Additionally, a user's own finger could be used for selecting or indicating portions of the displayed image on a touch-sensitive or proximity-sensitive display. Consequently, the term "user input device", as used herein, is intended to have a broad definition and encompasses many variations on well-known input devices.

Figure 3:
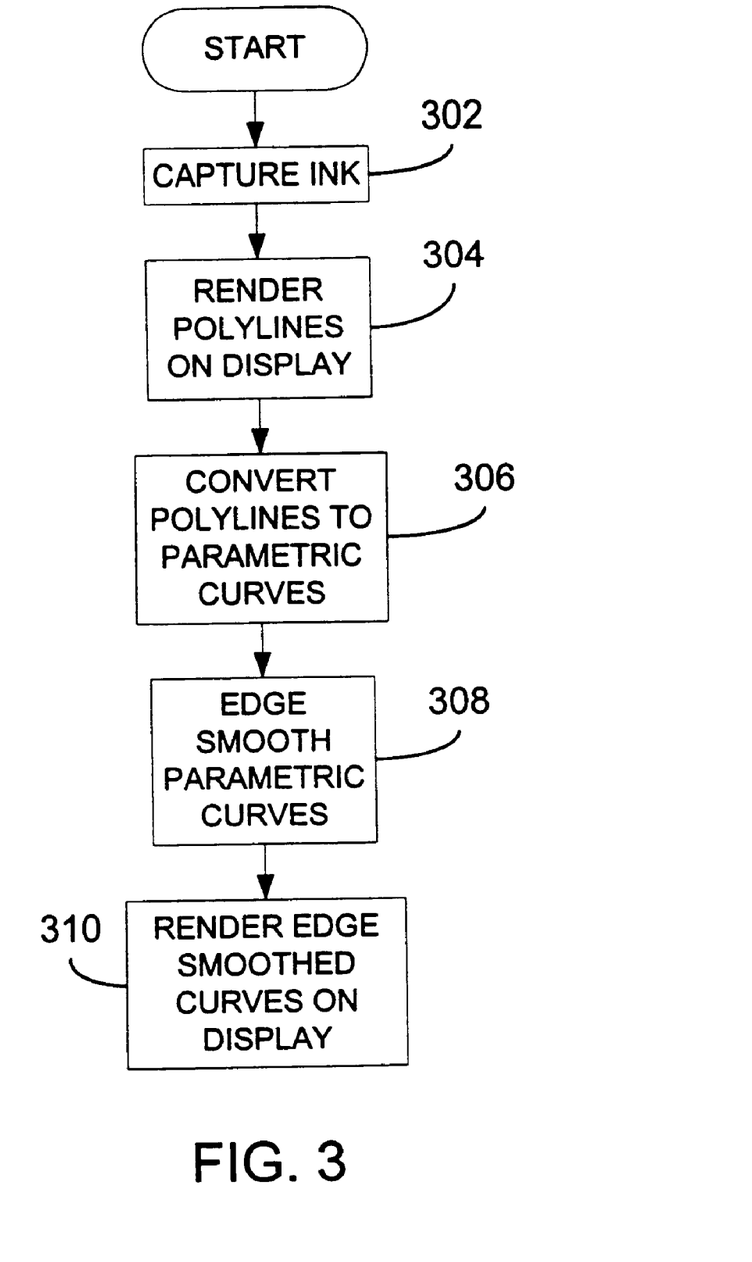
FIG. 3 is a flowchart illustrating a method in accordance with the present invention.

Referring now to FIG. 3, a method in accordance with the present invention is illustrated. In particular, the method illustrated in FIG. 3 is preferably implemented within a computing platform (e.g., the tablet computer 201 illustrated in FIG. 2) using stored program instructions (e.g., the operating system 195, application programs 196 or other program modules 197 illustrated in FIG. 1) executed by a suitable device (e.g., processing unit 110 illustrated in FIG. 1). As those having ordinary skill in the art will recognize, other implementations are readily devisable and the present invention is not limited in this regard.

At step 302, handwriting is digitally captured as described above. That is, a pen digitizer generates positional information (i.e., coordinate information), in addition to an indication that the digitizing pen is in contact with the writing surface. While it is preferable for the pen to be in contact with the writing surface, this is not a requirement and it is anticipated that the pen may be merely within a predefined proximity of the writing surface. Such an implementation is possible where, for example, the pen and digitizer operate electro-magnetically. When the pen is detected above or in contact with a digitizing writing surface, the coordinates of the subsequent movements of the pen are recorded. Preferably, the movements are sampled at a relatively high rate (e.g., at least 100 samples/second) and approximately the last second of the pen movement coordinate stream is recorded in a buffer in a well-known manner. Each time the pen is lifted from the writing surface, or the motion of the pen is detected to stop, the recorded coordinates of the pen motion can be further processed, as described below.

At step 304, the samples captured at step 302 are rendered on a display in the form of polylines, described above. Note that the polylines, represented in the relatively high-resolution coordinates of the digitizer samples, are converted to the lower resolution display coordinates in order to be displayed. As a result, aliasing effects will almost certainly be present. Nevertheless, the rendering of the polylines on the display provides a real-time representation of the captured handwriting.

Subsequently, at step 306, the polylines are converted to a parametric representation to effect a filtering of the displayed approximations. For example, the techniques describe by Polyakov may be used for this purpose. Other well-known conversion techniques, whereby the polylines are converted to bezier curves or quadratic b-spline representations, may be equally employed. In this manner, the noise or distortions resulting from polyline approximations, shaky user input, digitizer noise, etc. may be substantially reduced. Note that during the processing of step 306, the transformed handwriting samples maintain the relatively high resolution offered by the digitizer. As with the polylines, the filtered handwriting samples must still be converted to the relatively low-resolution display coordinates. As a result, aliasing effects from limited display resolution will still be present.

To this end, edge-smoothing processing is applied to the filtered and converted samples at step 308. Various edge-smoothing techniques are described in greater detail below with regard to FIGS. 6 and 7. At step 310, the edge-smoothed samples (represented in relatively low-resolution display coordinates) are rendered on the display. Additionally, the edge-smoothed samples may be stored in memory for later display or processing. The edge-smoothing processing mitigates the effects of the aliasing, thereby providing very smooth curves with a high quality appearance. In a preferred embodiment, the processing of steps 306 and 308 is performed during an interval between the initial display of the polyline curves at step 304 and subsequent refreshes of the display of the polyline curves. However, it is noted that the processing of steps 306 and 308 may be performed while additional handwriting samples are being captured, i.e., in near real-time, provided that sufficient processing capabilities are available.

Figure 7:
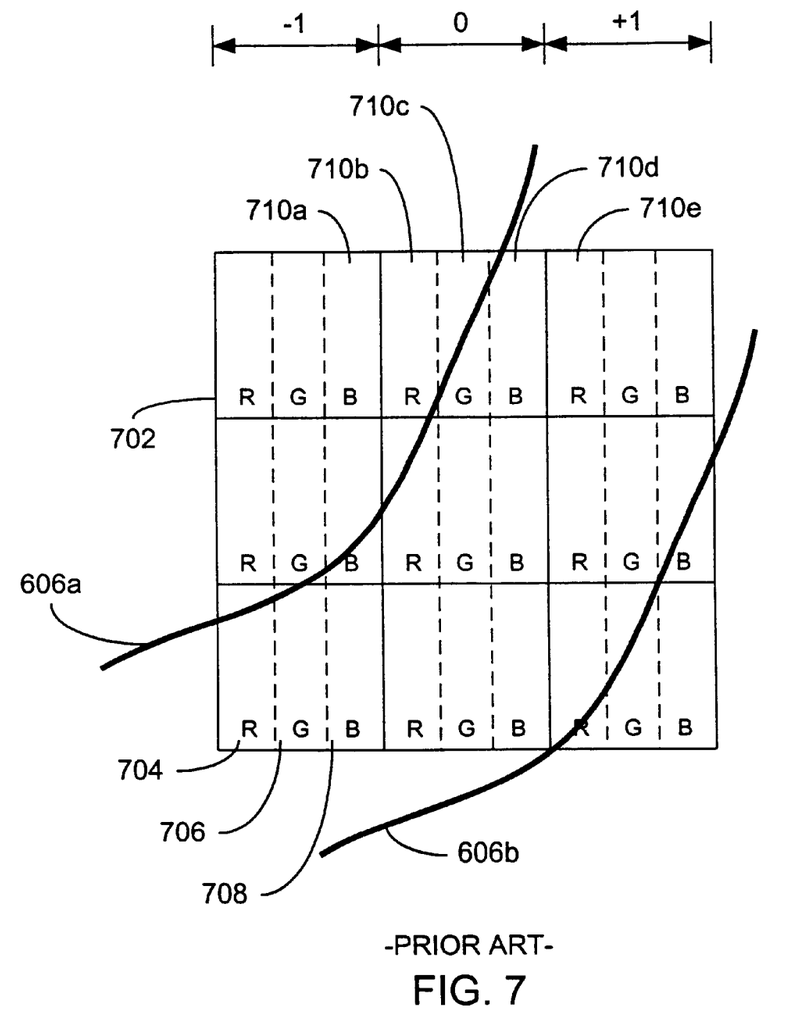
FIG. 7 illustrates a prior art technique for anti-aliasing processing particularly directed to use with liquid-crystal display (LCD) type displays.

As described above, various edge-smoothing or anti-aliasing techniques may be employed at step 308. Generally, these techniques are dependent upon the type of display being used, i.e., a CRT or LCD display. FIGS. 6 and 7 generally illustrate anti-aliasing techniques applicable to CRT and LCD displays, respectively.

As previously described, FIG. 6 illustrates a grid of picture elements 602 as would be found in a typical CRT display. Each display element 604 can be activated to display any one of a variety of colors. Where, however, a display element 608 is only partially covered by a desired foreground object (i.e., the curve represented by the region between the heavy lines 606a–b), the color selected for the partially covered display element must preferably comprise a blend of the foreground color, f, and the background (i.e., the region outside the curve) color, b. To this end, a coverage parameter, $\alpha$, may be defined for each partially covered display element representative of the percentage of the display element ideally covered by the foreground object. For example, the percentage of the partially covered display element 608 shown in FIG. 6 is represented by the shaded region and is, say, 40%. Thus, the color, f', of the partially covered display element 608 is selected according to the equation:

$$f'=\alpha \cdot f+(1-\alpha)\cdot b \qquad \text{Eq. (1)}$$

In effect, the color, f', of the partially covered pixel is a linear combination of the foreground and background colors as governed by the coverage parameter for that display element. Note that the coverage parameter is strictly a function of geometry of the display. The blending effected in this manner allows the human eye to more readily distinguish a distinct boundary by essentially softening the jagged edges otherwise produced by aliasing.

Referring now to FIG. 7, an anti-aliasing technique suitable for use with LCD displays is illustrated. In particular, FIG. 7 illustrates a grid of display elements 702 each comprising separate red (R) 704, green (G) 706 and blue (B) 708 sub-elements, as illustrated by the dashed lines. As in FIG. 6, a foreground curve is also illustrated as the region between the heavy lines 606*a–b*. In contrast to CRT displays, LCD displays operate by varying the intensities of the various sub-elements 704–708 for each picture element. Different techniques for improving displayed images that take advantage of the sub-element arrangement of LCD displays are disclosed in U.S. patent application Ser. Nos. 09/414,144, 09/414,147 and 09/414,148 all filed on Oct. 7, 1999, the teachings of which patent applications are hereby incorporated by this reference.

With respect to the present invention, LCD displays provide an opportunity to use refined coverage parameters. In particular, a filtered coverage parameter for each display element can be calculated, thereby taking advantage of the sub-element geometry offered by LCD screens. A separate coverage parameter, $\alpha_i$ for i=R, G, B, is defined for each sub-element. Thus, for any given partially covered display element, the color is selected according to Eq. (2) below:

$$f_i'=\alpha_i \cdot f_i+(1-\alpha_i)\cdot b_i \qquad \text{Eq. (2)}$$

where $\alpha_i$ represents a filtered coverage parameter for the i'th sub-element of the partially covered display element. Each filtered coverage parameter represents a linear combination of the i'th sub-element and its immediately neighboring (in the horizontal direction) sub-elements. A particular example of this is illustrated in FIG. 7.

Three columns of display elements are shown in FIG. 7. Display elements in the leftmost column are identified by the index "−1". Display elements in the center column are identified by the index "0". Display elements in the rightmost column are identified by the index "+1". A partially covered display element is comprised, for example, of sub-elements 710*b–d*. For each of the red, green and blue sub-elements 710*b–d* of the partially covered display element, filtered coverage parameters may be calculated according to the following:

$$\alpha_R(0)=\alpha_B(-1)+\alpha_R(0)+\alpha_G(0) \qquad \text{Eq. (3)}$$

$$\alpha_G(0)=\alpha_R(0)+\alpha_G(0)+\alpha_B(0) \qquad \text{Eq. (4)}$$

$$\alpha_B(0)=\alpha_G(0)+\alpha_B(0)+\alpha_R(+1) \qquad \text{Eq. (5)}$$

Thus, the filtered coverage parameter for each sub-element incorporates the coverage parameter for its neighboring sub-elements, i.e., those prior (including sub-elements in the −1 column) and subsequent (including sub-elements in column +1) to the each given sub-element. Using the filtered coverage parameters defined in Eqns. (3–5) in the color determination of Eq. (2) yields a blending of colors that takes advantage of the sub-element geometry typically found in LCD displays. Once again, the transitioning of the aliased display elements between foreground and background colors minimizes the jagged edge effect otherwise caused by aliasing.

The present invention provides a technique whereby the appearance of digitized handwriting may be improved. By incorporating edge-smoothing techniques with parametric curve representations, the present invention improves upon the prior art in that it reduces aliasing effects otherwise brought about by relatively low-resolution display screens. While the foregoing detailed description sets forth presently preferred embodiments of the invention, it will be understood that many variations may be made to the embodiments disclosed herein without departing from the true spirit and scope of the invention. This true spirit and scope of the present invention is defined by the appended claims, to be interpreted in light of the foregoing specifications.

What is claimed is:

1. In a computer that includes a display, a method for processing a user's handwriting provided as input to the computer, the method comprising steps of:
   digitizing the user's handwriting to provide a polyline representation of the user's handwriting;
   converting the polyline representation of the user's handwriting to provide a parametric representation of the user's handwriting; and
   performing edge-smoothing processing based on the parametric representation of the user's handwriting to provide a filtered and smoothed representation of the user's handwriting, wherein the edge-smoothing processing mitigates aliasing attributable to a relatively low resolution of the display by blending a foreground color of the handwriting with a background color at an edge between the handwriting and the background color; and
   mapping the parametric representation of the user's handwriting to a coordinate system corresponding to the display to provide a mapped parametric representation of the user's handwriting, wherein the step of performing edge-smoothing is performed on the mapped parametric representation of the user's handwriting.

2. A computer comprising:
   a processor
   a digitizing display, coupled to the processor and positioned to receive handwriting input from a pen, that provides digitized handwriting to the processor based on the handwriting input; and
   a storage device, coupled to the processor, having stored thereon instructions that, when executed by the processor, cause the processor to:
      convert the digitized handwriting to provide a parametric handwriting representation,
      perform edge-smoothing processing based on the parametric handwriting representation to provide a filtered and smoothed handwriting representation, wherein the edge-smoothing processing mitigates aliasing attributable to a relatively low resolution of the digitizing display by blending a foreground color of the handwriting with a background color at an edge between the handwriting and the background color, and
      map the parametric handwriting representation to a display coordinate system corresponding to the digitizing display to provide a mapped parametric handwriting representation, wherein the edge-smoothing is performed on the mapped parametric handwriting representation.

\* \* \* \* \*